United States Patent [19]

Chinzi

[11] Patent Number: 5,523,138
[45] Date of Patent: Jun. 4, 1996

[54] GLAZING ASSEMBLIES AND PROCESSES FOR THE FORMATION THEREOF

[75] Inventor: Calogero Chinzi, La Louvière, Belgium

[73] Assignee: Glaverbel, Brussels, Belgium

[21] Appl. No.: 286,966

[22] Filed: Aug. 8, 1994

[30] Foreign Application Priority Data

Aug. 12, 1993 [GB] United Kingdom ............. 9316821

[51] Int. Cl.⁶ ........................................ B32B 9/00
[52] U.S. Cl. ................. 428/43; 428/38; 428/137; 428/192; 428/212; 428/217; 428/339; 428/410; 428/424.2; 428/425.6; 428/426
[58] Field of Search ................. 428/192, 430, 428/410, 38, 43, 68, 137, 432, 426, 138, 201, 217, 212, 339, 424.2, 425.6; 219/203

[56] References Cited

U.S. PATENT DOCUMENTS 3,597,050  8/1971  Plumat .
5,270,518  12/1993 Naoumenko et al. ............. 219/203
5,350,613  9/1994  Deprez et al. ...................... 428/43

FOREIGN PATENT DOCUMENTS 0478836  4/1992  European Pat. Off. .
0503998  9/1992  European Pat. Off. .
562951   9/1993  European Pat. Off. .
1215471  12/1970 United Kingdom .
2165292  4/1986  United Kingdom .

Primary Examiner—Patrick J. Ryan
Assistant Examiner—Abraham Bahta
Attorney, Agent, or Firm—Spencer & Frank

[57] ABSTRACT

A glazing assembly, suitable for use as an emergency escape, includes a laminated panel composed of at least two sheets of vitreous material adhered to a polymeric intervening layer which extends continuously between the at least two sheets of vitreous material, wherein, in at least one minor area zone of the laminated panel, possibility of elongation of the polymeric intervening layer under the influence of mechanical stess when the at least two sheets of vitreous material are broken, is different compared with the possibility of elongation of the polymeric intervening layer over the rest of the laminated panel.

21 Claims, 2 Drawing Sheets

GLAZING ASSEMBLIES AND PROCESSES FOR THE FORMATION THEREOF

BACKGROUND OF THE INVENTION

This invention relates to glazing assemblies, in particular to glazing assemblies comprising a laminated panel having at least two sheets of vitreous material between which is a polymeric intervening layer. The invention also relates to processes for the formation of such glazing assemblies.

Certain modern railway vehicles, such as for example the vehicles of high-speed trains, are equipped with glazing assemblies which provide an acoustic isolation effect. The base structure of this assembly is a laminated panel comprising, for example, two sheets of glass having an intervening layer of "acoustic" resin. Thus, in British patent specification GB 2227207-A (Glaverbel), a glazing assembly is described having a laminated panel spaced from a single sheet of clear tempered glass, the panel having an outer sheet of clear tempered glass, an intervening layer of acrylic resin, a second sheet of clear tempered glass and an anti-solar coating.

The intervening layer of acoustic resin provides an attenuation in the acoustic transmission properties of the laminated panel. It is constituted by an adhesive material which secures the sheets of glass. It is a resin which, at ambient temperatures, has high mechanical energy absorption properties and which achieves a less monolithic connection between sheets of glass than the film of polyvinylbutyral usually used as an intervening adhesive for laminated panels, e.g. windshields.

Where there is a need to break through the panel for emergency escape purposes, e.g. when the glazing assembly is used in a vehicle, the panel is subjected to a suitable mechanical force, such as being struck by a hammer, to fracture the panel. The space thus formed may from then on be used as an emergency exit. However, in the case of a laminated panel, after the fracture of the two sheets of glass, the intervening polymeric layer maintains the fragments of glass in place and it is necessary to cut or tear the resin in order to get through the space. This is even more difficult when all the glass sheets of the assembly have been subjected to a thermal tempering treatment. The breaking of thermally tempered glass generates small non-sharp fragments, which are less likely to cause personal injury to persons escaping through the panel.

This operation of cutting the resin is not easy. It may take about 60 seconds to get through an assembly comprising thermally tempered glass and acoustic resin.

SUMMARY OF THE INVENTION

It is an object of the present invention to provide a glazing assembly suitable for use in an emergency exit, where the tearing or cutting away of the intervening layer in the case of emergency, is made easier.

It is a further object of the present invention to provide a process for the formation of such an improved glazing assembly.

According to the invention, there is provided a glazing assembly, suitable for use as an emergency escape, comprising a laminated panel having at least two sheets of vitreous material adhered to a polymeric intervening layer which extends continuously between said sheets, wherein in at least one minor area zone of the panel, the possibility of elongation of the intervening layer under the influence of mechanical stress when said at least two sheets of vitreous material are broken, is different compared with the possibility of elongation of said intervening layer over the rest of the panel.

The invention is particularly advantageous when the intervening layer is relatively thick, for example more than 1 mm, such as more than 1.2 mm.

In a preferred embodiment, the material of the intervening layer is a resin having acoustic insulation properties. The material of the intervening layer is preferably a polymeric material which has a liquid precursor which can be solidified in an situ. Preferably, the material of the intervening layer is polyester, a vinyl polymer, an epoxy resin or an acrylic resin.

The material of which said intervening layer is formed preferably has a Shore A hardness measured at 20° C. of not more than 50, such as not more than 30.

By stating that the assembly has acoustic isolation properties, it is to be understood that the intervening layer has viscoelastic properties such that the critical frequency of coincidence (or the lower or lowest critical frequency of coincidence if there is more than one) of the panel ["the coincidence frequency ($\Phi p$) of the panel"] is greater than the critical frequency of coincidence of a notional monolithic vitreous sheet ["the coincidence frequency ($\Phi m$) of the equivalent monolith"] which monolithic sheet is of the same shape and area as the panel and has a mass equal to the total mass of vitreous material in the panel.

The coincidence frequency ($\Phi p$) of the panel is preferably at least 1.2 times, such as at least 1.5 times the coincidence frequency ($\Phi m$) of the equivalent monolith and the assembly affords an acoustic attenuation $R_w$ of at least 37 dB.

Each vitreous sheet may have been subjected to a mechanical strengthening treatment, such as thermal or chemical tempering.

Thermally tempered glass with a thickness of from 3 to 6 mm is particularly suitable. The fragmentation of this glass leads to small pieces with little or no sharpness.

When there is a need to break through the panel for emergency escape purposes, the panel is subjected to a suitable mechanical force, such as being struck by a hammer, to fracture the panel. A difference in mechanical properties of the panel is achieved according to the invention, by providing that the possibility of elongation of the intervening layer in said zone under the influence of a mechanical stress is different compared with the possibility of elongation of said intervening layer over the rest of the panel. By providing that the mechanical properties of the panel differ in one zone, it can be ensured that, when the panel is subjected this mechanical force, the intervening material is more easily torn or cut away, thereby enabling faster escape. The invention thereby enables easy escape through a window space while maintaining the security performance of the assembly at a satisfactory level.

A further difference in mechanical properties may be achieved according to an embodiment of the invention, wherein the adherence of the intervening layer in said zone, to at least one of the vitreous sheets is different compared with the adherence of the intervening layer to the same vitreous sheet over the rest of the panel.

The zone of differing possibilities of elongation constitutes a minor area of the panel, preferably less than 10% of the panel by area. The zone is preferably of an elongate shape, particularly having a generally straight delimiting edge. Preferably, the zone is in the shape of a straight band which extends over a length sufficient to permit the passage of a human being through the panel when the intervening layer is torn or cut away.

The different possibilities of elongation of the intervening layer may be achieved by a local modification of the chemical composition of the layer. Preferably, said different possibilities of elongation are achieved by disposing in said zone a material having a modulus of elasticity higher than that of the intervening layer. Thus, a film of material less deformable than the intervening layer may be disposed in said zone in contact with the intervening layer e.g. embedded in the polymer or preferably fixed to the vitreous sheet in said zone. The film may be formed of a non-brittle material. Thus, in a preferred embodiment, at least one of the vitreous sheets carries an adherent film on the internal face thereof. That face of the film which is in contact with the intervening material may be non-adherent. The film may be constituted by a tape of polymeric material one face of which adheres to the vitreous material while the face adjacent the intervening layer carries a silicone material. This tape is disposed in such a way that the siliconised face should be in contact with the resin when the latter is applied between the two vitreous sheets. The siliconised face reduces the adherence of the tape to the intervening layer material.

In a variation, the tape may adhere to the resin and be nonadherent (siliconised) to the surface of the glass. If the glass is broken in small pieces, these pieces do not adhere to the tape and may fall away or be easily removed by opening up a space in which a tool may be inserted to assist with the tearing or cutting of the intervening layer. Preferably, the film is adherent on both faces for sticking both to the glass and to the intermediate layer. This enables the greatest rigidity of the intermediate layer in this zone, when the sheets are broken. Most preferably, such a tape is provided on each of said vitreous sheets, the two tapes being preferably stuck one behind the other in register. The tape may be formed of a polymeric material selected from polyester, polypropylene, PVC and copolymers thereof. Alternatively, the tape comprises a metallic foil, for example the material of the metallic foil may comprise copper or aluminium.

The tape may also be in the form of an open net which can be penetrated by the resin.

The tape preferably has a width within the range of from 2 mm to 10 min.

The difference in adherence may be achieved according to another embodiment of the invention, wherein a localised anti-adherent treatment of the surface of the vitreous sheet in the form of a straight band is effected, for example, in such a manner that the resin does not adhere to the sheet in this zone. This introduces a heterogeneity for facilitating the breaking through of the window space. In this case it is preferable that the two vitreous sheets are treated on facing sides.

The invention also provides a process for the formation of a glazing assembly comprising a laminated panel having at least two sheets of vitreous material adhered to a polymeric intervening layer which extends continuously between said sheets, wherein in at least one minor area zone of the panel the possibility of elongation of the intervening layer under the influence of mechanical stress when said at least two sheets of vitreous material are broken, is modified compared with the possibility of elongation of said intervening layer over the rest of the panel.

As stated above, the material of the intervening layer is preferably a polymeric material which has a liquid precursor which can be solidified in situ. The liquid precursor may be poured between two sheets of vitreous material fixed at their periphery by a bead of butyl rubber or by a double-sided adhesive tape or any other suitable sealing material. The solidification of the precursor may be achieved by including a setting agent in the precursor, before or during filling of the assembly. One may also use a single component precursor which can be solidified by exposure to radiation, such as to UV radiation.

A preferred embodiment of this process comprises the following steps:

an adhesive film of material less deformable than the material of the intervening layer is fixed in said zone to one face of one of the two sheets;

a hollow panel is formed with the two sheets with the aid of a peripheral intervening element, the adhesive film being disposed in the hollow space;

the hollow space is filled with a polymerisable precursor of the intervening material in liquid form; and the intervening material precursor is polymerised to form the intervening layer.

A further difference in mechanical properties may be achieved according to an embodiment of the invention, wherein the vitreous material and/or the material of the intervening layer is treated in said zone to modify the adherence of the material of the intervening layer to at least one of the vitreous sheets, compared with the adherence of the intervening layer to the same sheet over the rest of the panel.

Optionally, visible markings are provided to indicate where it is preferable to hit the assembly with a hammer for breaking the vitreous sheets in the event of a need for emergency exit. Such target markings may be formed by silk screen printing on one face of the assembly. The provision of target markings are particularly useful when an invisible adhesive tape or anti-adhesive treatment is used to generate the zone of different mechanical properties. The use of a visible tape, for example a coloured tape, would avoid the need for providing additional target markings.

In some preferred embodiments of the invention, the laminated panel is in spaced face-to-face relationship with another sheet of vitreous material, or another laminated panel, to form a hollow glazing unit. Hollow glazing units can have very good acoustic insulation characteristics and they afford good thermal insulation. In order to alleviate transmission peaks due to cavity resonance, a number of damping members may be positioned in the hollow space.

Advantageously, the glazing assemblies according to the invention may be provided with one or more coatings on the surfaces of the vitreous sheets to control the light transmitting properties thereof. Such coatings will generally be very thin (for example of the order of tens of nanometers) and do not therefore significantly effect the break-through properties of the assembly.

A suitable assembly construction to which the invention may be applied, is, for example: exterior/6 mm thermally tempered clear glass/1.5 mm acrylic resin/5 mm thermally tempered clear glass/about 70 nm "Stopsol"(Trade Mark) coating/12 mm air space/optionally a low emissivity coating/5 mm thermally tempered clear glass/interior. We have found that the presence of the additional single sheet of thermally tempered glass in such an assembly does not significantly lengthen the break-through time.

BRIEF DESCRIPTION OF THE DRAWINGS

The invention will now be further described, purely by way of example, with reference to the accompanying drawings in which.

DESCRIPTION OF THE PREFERRED EMBODIMENTS

Figure 1:
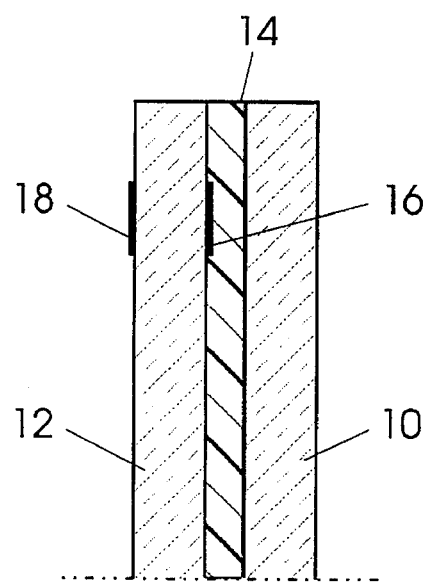
FIG. 1 shows a cross-section of a glazing panel according to one embodiment of the invention.
Figure 2:
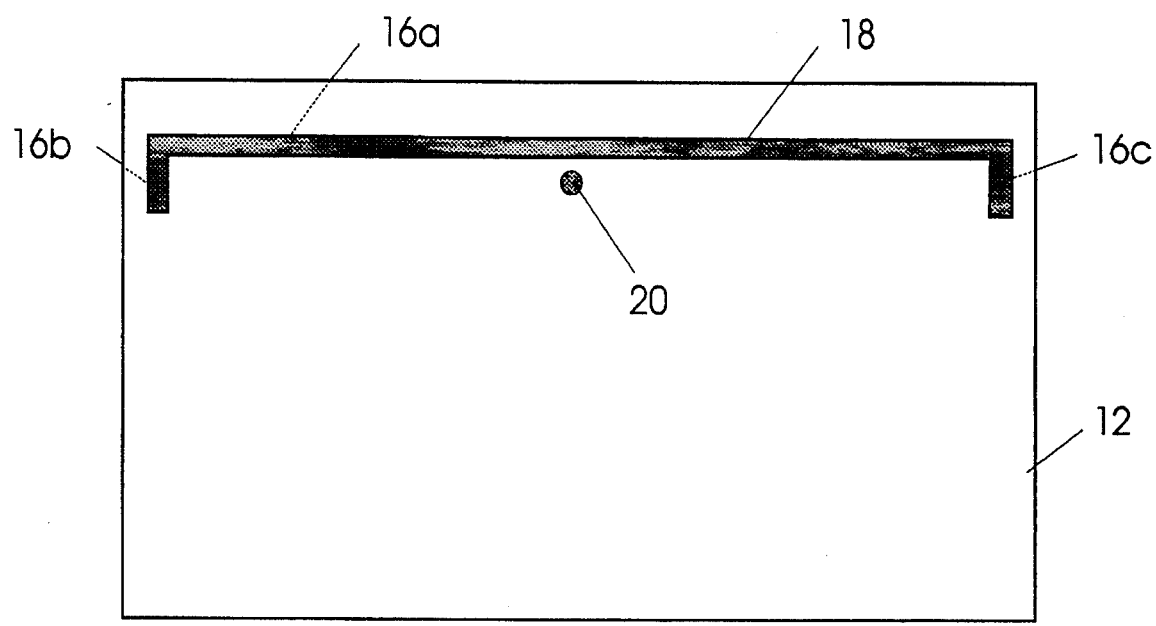
FIG. 2 shows a front view of the glazing panel shown in FIG.1.

In the assembly shown in FIGS. 1 and 2, an exterior sheet of thermally tempered glass 10, having a thickness of 6 mm is positioned in spaced face-to-face relationship to an interior sheet of thermally tempered glass 12 (thickness 5 mm). The sheets adhere to an "acoustic" acrylic polymer resin layer 14, (of uniform thickness 1.5 mm) which extends continuously between the sheets, filling the space therebetween. The "acoustic" resin is an acrylic resin UVEKOL (Trade Mark) Type A10, manufactured by UCB, referred to in British patent specification GB2227207-A (Glaverbel). Each of the glass sheets has a dimension of approximately 1.50 m by 0.80 m, which is suitable for incorporation in a vehicle such as a high-speed train carriage.

A line of adhesive tape 16 is secured to the inner face of the glass sheet 12. The line of tape is in the shape of an inverted "U", having a long straight horizontal portion 16a positioned at a distance of 50 mm from the top long edge of the assembly, and extending substantially across the whole width of the assembly, and two downwardly extending short vertical portions 16b, 16c each positioned at a distance of about 100 mm from an adjacent edge of the assembly, but extending over a distance of only 120 mm from the long horizontal portion 16a.

The tape 16 is constituted by a very thin film of polyester of 8 mm width, such as "Scotch"(Trade Mark) adhesive tape, manufactured by the 3M Company, having its adhesive side positioned against the glass sheet 12 and its opposite side in non-adhering contact with the resin layer 14. An opaque marking band 18, formed by silk screen printing on the external face of the glass sheet 12, corresponds in position to the tape 16 and hides the appearance thereof. The marking band 18 also indicates the zone where it is necessary to tear the resin layer. A target point 20, also formed by silk screen printing, indicates the point where it is preferable to hit the glass sheet 12 with a hammer to break the assembly.

Break-through tests carried out with this described embodiment gave a break-through time of 40 seconds, much less than that of the base structure (the identical structure save for the tape 16 and the markings 18 and 20). The shock resistance of the assembly is however not diminished with respect to the base structure.

With the application of mechanical force at the target point 20 just below the tape 16, both glass sheets 10 and 12 shatter into small fragments, held in place by the resin layer 14. In the zone of the tape 16, the possibility of elongation of the intervening layer is different compared with the possibility of elongation of said intervening layer over the rest of the panel. By applying pressure in the zone of the tape 16, preferably just below the tape 16, the elongation of the resin layer 14 occurs to the point where rupture may be achieved. Once the resin layer 14 is torn horizontally, it is sufficient to push outwards to achieve vertical tearing of the resin layer 14 and thereby an opening up of the window space by a dimension sufficient to enable a human being to escape from the vehicle.

In an alternative embodiment, the adhesive tape 16 is constituted by double-sided adhesive tape.

In another variation (not shown in the drawings) one may replace the adhesive tape 16 by aluminium foil (0.10 to 0.20 mm thickness) stuck to the interior face of the glass sheet 12. This foil may be coloured in such a way that the silk screen printed marking 18 is unnecessary. The foil, being more rigid, (i.e. having a modulus of elasticity higher than that of the resin layer 14) enables the stretching of the resin layer 14 at the edges of this tape.

Figure 3:
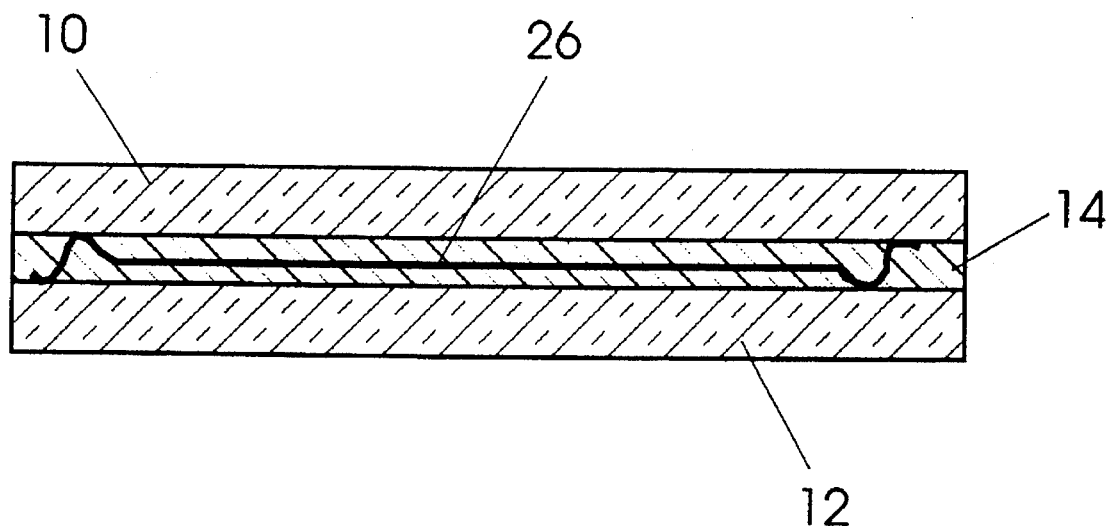
FIG. 3 shows a cross-section taken on a horizontal axis of the glazing panel shown in FIG. 2, modified according to a second embodiment of the invention.

In the embodiment shown in FIG. 3, the tape 16, secured to the interior face of the glass sheet 12 is replaced by a tape 26 of aluminium foil embedded in the heart of the resin layer 14. Note that in FIG. 3 the thickness of the resin layer 14 is exaggerated for the sake of clarity of the drawing.

Figure 4:
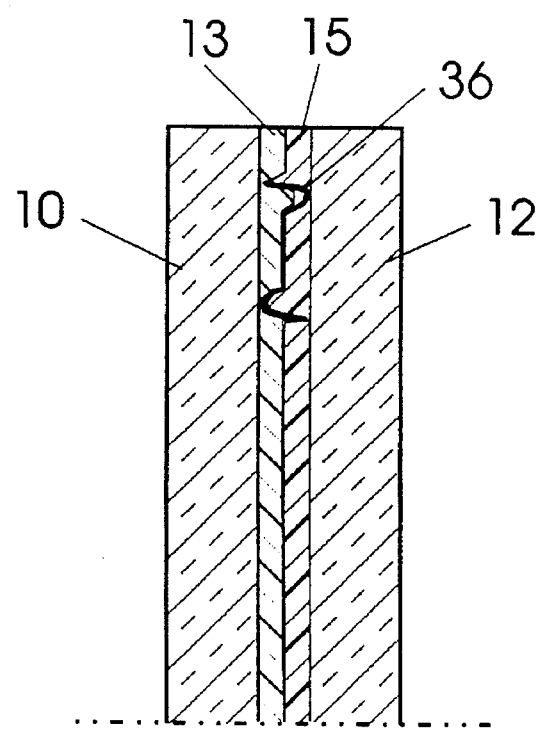
FIG. 4 shows a cross-section taken on a vertical axis of the glazing panel shown in FIG. 2, modified according to a third embodiment of the invention.

In FIG. 4, the tape 36 is a copper foil of about 0.1 mm thickness. This assembly may be formed as follows. A film of PVB 13 of 0.38 mm thickness is disposed on the sheet of glass 10. The copper tape 36 is disposed on the PVB at the desired location. Another film 15 of PVB with a thickness of 0.38 mm is disposed on the assembly, thereby covering the tape 36. Then the second sheet of glass 12 is placed in position and the assembly is subjected to a laminating processes under elevated pressure and temperature, as for a conventional laminate. As a result of the softening of the PVB at the elevated temperature and the pressure applied to the glass sheets, the bent edges of the tape 36 encased in the PVB at this point create a zone where the possibility of elongation of the PVB is larger as a result of its reduced thickness.

Given that the PVB will only tear with difficulty, it is necessary that the tape 36 extends vertically at both sides of the panel, as shown in FIG. 2, in such a manner as to define an opening of sufficient size for a human being to escape there-through. The descending vertical portions of the tape 36 are not seen in FIG. 4.

When the sheets of glass are fractured, it will therefore be possible to tear the PVB along the length of the ribbon 36, by reason of its localised weakness (in practice the PVB is cut by the edges of the tape 36) and thereby to effect an emergency escape.

What is claimed is:

1. A glazing assembly, suitable for use as an emergency escape, comprising:

a laminated panel comprised of at least two sheets of vitreous material adhered to a polymeric intervening layer which extends continuously between the at least two sheets of vitreous material; and a film, which is less deformable than the polymeric intervening layer, disposed in at least one minor area zone in contact with the polymeric intervening layer, wherein, in the at least one minor area zone of the laminated panel, possibility of elongation of the polymeric intervening layer under the influence of mechanical stress when the at least two sheets of vitreous material are broken, is different compared with the possibility of elongation of the polymeric intervening layer over the rest of the laminated panel.

2. The glazing assembly according to claim 1, wherein the polymeric intervening layer is comprised of a material having a Shore A hardness measured at 20° C. of not more than 50.

3. The glazing assembly according to claim 2, wherein the polymeric intervening layer is comprised of a material having a Shore A hardness measured at 20° C. of not more than 30.

4. The glazing assembly according to claim 1, wherein the polymeric intervening layer has a thickness which is at least 1 mm.

5. The glazing assembly according to claim 1, wherein the polymeric intervening layer is comprised of a resin having high acoustic insulation properties.

6. The glazing assembly according to claim 1, wherein the glazing assembly affords an acoustic attenuation $R_w$ of at least 37 dB.

7. The glazing assembly according to claim 1, wherein the polymeric intervening layer is comprised of an acrylic resin.

8. The glazing assembly according to claim 1, wherein each sheet of the at least two sheets of vitreous material has been subjected to a mechanical strengthening treatment.

9. The glazing assembly according to claim 8, wherein each sheet of the at least two sheets of vitreous material has been subjected to thermal tempering.

10. The glazing assembly according to claim 1, further comprising a material having a modulus of elasticity higher than that of the polymeric intervening layer disposed in the at least one minor area zone.

11. The glazing assembly according to claim 1, wherein the film is a straight tape which extends over a length sufficient to permit passage of human being through the laminated panel when at least two sheets of vitreous material are broken and the polymeric intervening layer is one of torn or cut away.

12. The glazing assembly according to claim 1, wherein the film is comprised of a material which is non-brittle.

13. The glazing assembly according to claim 1, wherein at least one of the at least two sheets of vitreous material carries an adherent film on its internal face.

14. The glazing assembly according to claim 13, wherein the adherent film has a face which is adherent, and wherein the face of the film which is adherent is in contact with the polymeric intervening material.

15. The glazing assembly according to claim 1, wherein a plurality of films which are less deformable than the polymeric intervening layer is provided, one film being provided on each sheet of the at least two sheets of vitreous material.

16. The glazing assembly according to claim 1, wherein the film is comprised of a polymeric material selected from the group consisting of polyester, polypropylene, PVC, and copolymers thereof.

17. The glazing assembly according to claim 1, wherein the film comprises a metallic foil.

18. The glazing assembly according to claim 17, wherein the metallic foil is comprised of a metal selected from the group consisting of copper and aluminum.

19. A process for the formation of a glazing assembly, comprising:

providing a laminated panel by adhering at least two sheets of vitreous material to a polymeric intervening layer which extends continuously between the at least two sheets; and introducing, in at least one minor area zone, a film comprised of a material which is less deformable than the material of the polymeric intervening layer, wherein, in the at least one minor area zone of the laminated panel, possibility of elongation of the polymeric intervening layer under the influence of mechanical stress when the at least two sheets of vitreous material are broken, is modified compared with the possibility of elongation of the polymeric intervening layer over the rest of the laminated panel.

20. The process according to claim 19, further comprising:

fixing an adhesive film comprised of a material which is less deformable than the material of the polymeric intervening layer in the at least one minor area zone to one face of one of the at least two sheets of vitreous material;

forming a hollow panel with the at least two sheets of vitreous material by defining therebetween a hollow space with the aid of a peripheral intervening element, the adhesive film being disposed in the hollow space;

filling the hollow space with a precursor of the material of the polymeric intervening layer, which precursor is polymerizable and is in liquid form; and polymerizing the precursor to form the polymeric intervening layer.

21. The process according to claim 19, further comprising treating at least one of the vitreous material and the material of the polymeric intervening layer in the at least one minor area zone to modify adherence of the material of the polymeric intervening layer to at least one of the at least two sheets of vitreous material, compared with adherence of the polymeric intervening layer to the same respective at least one sheet over the rest of the laminated panel.

* * * * *